Dec. 17, 1929.  S. L. BROWN  1,739,575
WINDOW CAME
Filed May 24, 1928
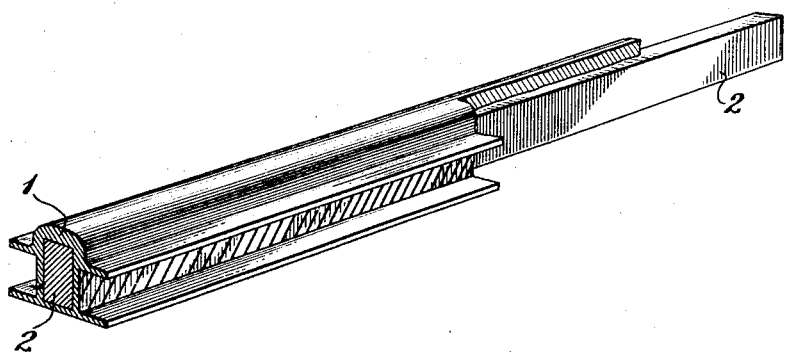

Patented Dec. 17, 1929

1,739,575

UNITED STATES PATENT OFFICE

SYDNEY L. BROWN, OF BROOKLYN, NEW YORK, ASSIGNOR TO NATIONAL LEAD COMPANY, OF NEW YORK, N. Y., A CORPORATION OF NEW JERSEY

WINDOW CAME

Application filed May 24, 1928. Serial No. 280,175.

The invention is a reinforced lead came, the improvement consisting in reduction of weight and better facility of use.

The drawing illustrates the new came which is not different from the ordinary reinforced lead came, except that the reinforcement instead of being of steel as customary, is constituted of a strip or rod of hard compressed fiber. The lead body of the came is marked 1 and the fibre reinforcement, 2. The substitution of fibre for steel affords the advantage that the came can be readily and neatly cut to the length required for assembly in the window, with square, mitred or fish-tailed end, by the use of an ordinary saw, the same as used for solid lead cames and without danger of distorting or mutilating the lead portion and also without unduly dulling the saw teeth. This is not possible with steel reinforced cames because the hard core tends to deflect the saw into the relatively soft lead, especially when making an oblique cut, thus impairing the appearance of the joint and causing loss of time in repairing the damage. I have discovered that a came reinforced with hard non-metallic material like fibre is quite as stiff and strong as those reinforced with steel, and fully as acceptable in point of strength while being appreciably lighter in weight. The stiffener is not affected by the soldering heat.

The came may be made by the same method as heretofore, that is to say, the main lead body is first formed with a longitudinal hole of appropriate section and the rod of fiber is pushed into it, and the body is then subjected to compression as by rolling or the like which consolidates the two members into a stiff composite structure, the lead being thus pressed into intimate surface contact with the fiber, which binds them together thus promoting stiffness, but it may also be made by other methods with the same effect. The non-metallic stiffener may be of any hard and stiff material which cuts or saws about the same as lead, or at least easier than steel; ordinary compressed wood fiber, such as commonly used in the arts, is preferred, this material being sufficiently pliable when encased in the lead to permit the came to be bent to some degree of curvature in its flatwise direction, but being practically as stiff as steel in an edge-wise direction.

Having described my invention, the following is claimed:

1. A came having a lead body and a non-metallic stiffener of hard and stiff material which cuts about the same as lead incorporated therein.

2. A came having an interior non-metallic stiffener of hard and stiff material which cuts about the same as lead and an exterior lead body compressed around and upon it.

3. A came having a lead body and a compressed fiber rod incorporated therein.

In testimony whereof, I have signed this specification.

SYDNEY L. BROWN.